US009991107B2

(12) United States Patent
Mullen et al.

(10) Patent No.: US 9,991,107 B2
(45) Date of Patent: Jun. 5, 2018

(54) METHODS OF PERFORMING ION-ION REACTIONS IN MASS SPECTROMETRY

(71) Applicant: Thermo Finnigan LLC, San Jose, CA (US)

(72) Inventors: Christopher Mullen, Menlo Park, CA (US); Chad R. Weisbrod, San Jose, CA (US); John E. P. Syka, Charlottesville, VA (US)

(73) Assignee: Thermo Finnigan LLC, San Jose, CA (US)

( * ) Notice: Subject to any disclaimer, the term of this patent is extended or adjusted under 35 U.S.C. 154(b) by 0 days. days.

(21) Appl. No.: 15/188,955

(22) Filed: Jun. 21, 2016

(65) Prior Publication Data

US 2017/0365453 A1 Dec. 21, 2017

(51) Int. Cl.
*G01N 27/62* (2006.01)
*H01J 49/00* (2006.01)
*H01J 49/42* (2006.01)

(52) U.S. Cl.
CPC .......... *H01J 49/0072* (2013.01); *G01N 27/62* (2013.01); *H01J 49/0027* (2013.01); *H01J 49/4225* (2013.01)

(58) Field of Classification Search
CPC .......................... H01J 49/0072; H01J 49/0095
See application file for complete search history.

(56) References Cited

U.S. PATENT DOCUMENTS

| | | | | |
|---|---|---|---|---|
| 7,534,622 B2 | 5/2009 | Hunt et al. | | |
| 7,692,142 B2 * | 4/2010 | Schwartz | H01J 49/0045 250/281 | |
| 8,227,748 B2 * | 7/2012 | Berg | H01J 49/0072 250/282 | |
| 2012/0156792 A1 | 6/2012 | Syka et al. | | |

OTHER PUBLICATIONS

Compton, Philip D. et al. "Optimization of electron transfer dissociation via informed selection of reagents and operating parameters." Analytical Chemistry (2012) 84 1781-1785.*

Coon, et al., "Electron Transfer Dissociation of Peptide Anions", J Am Soc Mass Spectrom 2005, 16, pp. 880-882.

Emory, et al., "Transmission mode ion/ion reactions in the radiofrequency-only ion guide of hybrid tandem mass spectrometers", Rapid Communication in Mass Spectrometry, 2009, 23 (3), pp. 409-418.

* cited by examiner

*Primary Examiner* — Christopher Adam Hixson
(74) *Attorney, Agent, or Firm* — Nicholas Cairns

(57) ABSTRACT

A method is described that produces product ions for mass analysis, the method comprising the steps of: introducing precursor ions into an RF electric field ion containment device, introducing reagent ions into the RF electric field ion containment device and performing an ion-ion interaction in the RF electric field ion containment device by co-trapping the precursor ions with the reagent ions. Precursor ions and product ions may be retained and/or isolated in the RF electric field ion containment device. The steps above may be repeated until a predetermined amount of reaction completeness is attained. Mass analysis of at least some of the (Continued)

ions in the RF electric field ion containment device may be performed where the ions are mass analyzed either directly from the RF electric field ion containment device.

15 Claims, 9 Drawing Sheets

I 400
1000
m/z
2000

I 400
1000
2000
m/z

METHODS OF PERFORMING ION-ION REACTIONS IN MASS SPECTROMETRY

TECHNICAL FIELD OF THE INVENTION

This invention relates generally to methods for dissociating ions for analysis by mass spectrometry, and more specifically to a method of optimizing conditions for ion-ion reactions.

BACKGROUND TO THE INVENTION

Analysis of samples by mass spectrometry often involves the use of one or more stages of ion dissociation or fragmentation, referred to as MS/MS for a single stage of ion dissociation or MSn analysis for multiple stages of ion dissociation. The dissociation of ions generated from a sample yields characteristic product ions, and the measured intensities and mass-to-charge ratios (m/z's) of these product ions are useful for structural elucidation, as well as for detecting and/or quantifying targeted analytes with high specificity and sensitivity. Historically, ion dissociation has been most commonly performed in mass spectrometers by collisional fragmentation techniques known variously as collision induced dissociation (CID), collision activated dissociation (CAD), and higher energy collisional dissociation (HCD). These collisional fragmentation techniques, which produce mainly b- and y-type ions during fragmentation of polypeptides, utilize relatively high energy collisions between precursor analyte molecules or ions and a neutral gas such as helium, nitrogen or argon.

Electron transfer dissociation (ETD) is a more recently developed ion-ion reaction technique in mass spectrometry that utilizes radical anions (negatively charged reagent ions or reagent anions) to transfer electrons to sample precursor/product ions that may result in bond cleavage and consequent generation of product ions. Various aspects of ETD are described in: U.S. Pat. No. 7,534,622 by Hunt, et al.; by Coon, et al. (American Society for Mass Spectrometry, 2005, 16, 880-882); by Emory, et al. (Rapid Communications in Mass Spectrometry, 2009, 23 (3), 409-418); and by Syka et al. in U.S. Patent Application No. US20120156792A1, the disclosures of which are incorporated herein by reference. ETD is an especially valuable technique for the analysis of post-translationally modified peptides and proteins, because ETD induces fragmentation mainly along the peptide backbone in a sequence-independent manner and often leaving labile post translational modifications (PTMs) linked to the peptide chain (unlike collisional dissociation methods, which cleave many PTMs off of the peptide). Furthermore, ETD produces primarily c- and z-type product ions that complement the b- and y-type product ions produced by collisional dissociation, increasing sequence coverage and peptide identifications. Herein, the term, "ion-ion reaction" refers to a reaction that occurs between two different ions of opposite polarity in the gas phase.

The kinetics of ion-ion reaction systems is well understood, with the rate constant for ion-ion capture described by equation 1 below:

$$k_c = v\frac{\pi}{2}\left[\frac{Z_1 Z_2 e^2}{\mu v^2}\right]^2 \qquad \text{Equation 1}$$

where v is the relative velocity of the ion-ion pair, $Z_1$ and $Z_2$ are the charges of the reactant species, e is the electrostatic charge of an electron, and μ is the reduced mass of the collision pair. When a large excess of the reagent ions are maintained throughout the course of the reaction, a pseudo first order criterion is met, with the rate of reaction described by:

$$A^+ + R^- \xrightarrow{k} \text{Products} \qquad \text{Equation 2}$$

$$r = k[A^+][R^-] = k'[A^+] \qquad \text{Equation 3}$$

where $[A^+]$ and $[R^-]$ represent the precursor analyte and reagent concentrations respectively, k represents the rate coefficient for the reaction and k' represents the pseudo first order rate coefficient for the reaction ($k[R^-]$). Knowledge of the rate coefficient for the reaction system in conjunction with pseudo first order kinetics allows for prediction of the reaction completeness, and truncation of the reaction at a predetermined point that yields the best chemical information, i.e. at the point that affords the highest spectral signal to noise ratio, or best sequence coverage, for example.

When the pseudo first order approximation breaks down, predicting the amount of reaction completeness becomes challenging, as the rates of the individual chemical reactions are continually changing with time. Furthermore, in cases where the analyte precursor is in a large excess to the reagent, or the ion-ion reaction proceeds through enough generations to significantly deplete or completely consume the reagent population, a desirable amount of reaction completeness may be difficult to achieve. This often be the case during ion-ion reactions of precursors found in many top down proteomics experiments when, for example, the precursor is a large polypeptide, and the number of precursor ion charges in a RF ion containment device is high. Hardware modification to instrumentation by increasing the size of a RF electric field ion containment device where the ion-ion reactions proceed is one solution to this problem but is undesirable and not routinely feasible. Accordingly there is a need for a simpler, alternative approach to optimize the analysis of ion-ion reactions in mass spectrometry without having to resort to significant and expensive hardware changes.

SUMMARY OF THE INVENTION

A method is described that produces product ions for mass analysis, the method comprising the steps of: introducing precursor ions into an RF electric field ion containment device, introducing reagent ions into the RF electric field ion containment device and performing an ion-ion interaction in the RF electric field ion containment device by co-trapping the precursor ions with the reagent ions. Precursor ions and product ions may be retained and/or isolated in the RF electric field ion containment device. The steps above may be repeated until a predetermined amount of reaction completeness is attained. Mass analysis (or more strictly, m/z analysis) of at least some of the ions in the RF electric field ion containment device may be performed where the ions are mass analyzed either directly from the RF electric field ion containment device (for example, or where the ions are transferred to a separate mass analyzing device, for example, to an ORBITRAP™ of to a TOF mass analyzer.

Any unreacted reagent ions and/or reacted reagent ions from the RF electric field ion containment device may be ejected during or directly after performing the ion-ion reaction step above. The RF electric field containment device may be a quadrupole, hexapole, octopole or higher multipole. The RF electric field ion containment device may be an ion trap, such as a linear two dimensional (2D) ion trap or even a Paul trap. A linear ion trap may be segmented into a plurality of sections, each section having a separate set of electrodes, for example, a linear ion trap with three discreet sections may have a front section, a middle section and a rear section. A linear ion trap may comprise a high pressure ion trap and a low pressure ion trap.

Reagent anions for ETD may include azulene, azobenzene, 2,2'-biquinoline, homazulene, acenaphthalene, fluoranthene, perfluorodecalin, perfluoro-methyl-decalin, xenon, iodine, perfluoroperhydrophenanthrene, or any combination of these anions. Reagent ions for nEDT may include fluoranthene cation. Reagent ions and precursor ions may occupy separate, distinct sections of the RF electric field ion containment device prior to ion-ion reactions occurring. Ion-ion interactions may include ETD reaction, negative ETD reaction or proton transfer reactions. Initially, reagent ions will usually be in excess of precursor ions, though this may not always be the case as a multi-reagent fill approach should achieve an overall excess of reagent ions. Reagent ions may be initially approximately comparable in number to precursor ions. Precursor ions may initially be in excess of the reagent ions, again, using a reagent multi-fill approach should result in precursor ions being exposed to an overall excess of reagent ions if all reagent ions of all fills are compared to precursor ions.

BRIEF DESCRIPTIONS OF THE DRAWINGS

The drawings, described below are for illustration purposes only and may not be drawn to scale. The drawings are not intended to limit the scope of the present teachings in any way and are not necessarily presented in any formal order. The term, "RF electric field ion containment device" as used herein refers to a multipolar device that contains trapped ions within the device, that is, it does not refer to a device wherein ions pass directly through the device without being trapped.

Figure 4A:
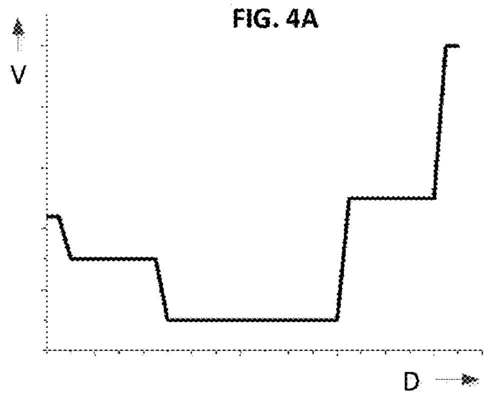
Figure 4B:
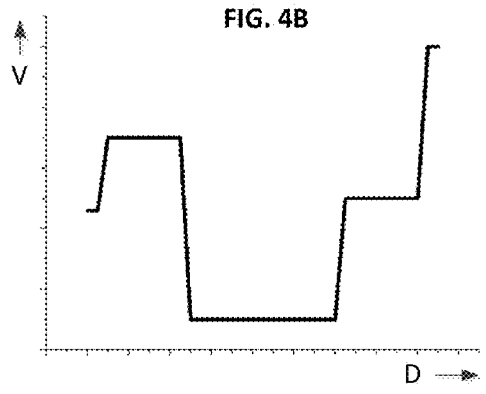
Figure 4C:
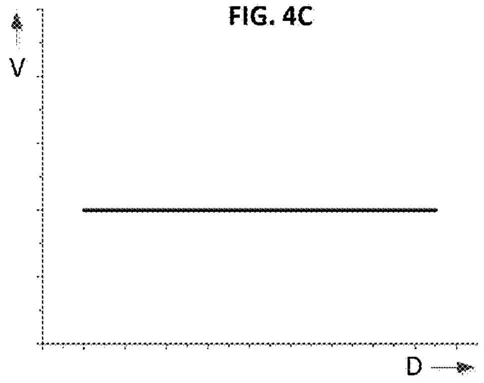
Figure 4D:
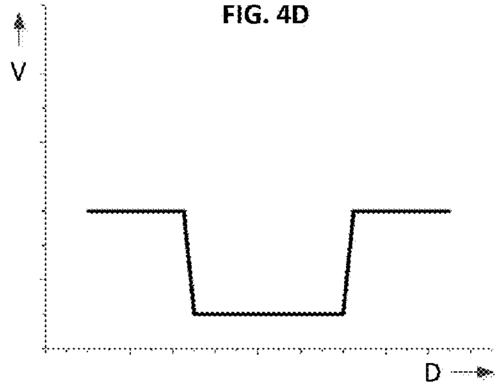

FIGS. 4A-D show the relative DC voltages applied to a three section ion trapping device. FIG. 4A represents the relative potentials of positively charged precursor injection, FIG. 4B represents the relative potentials of negatively charged reagent injection, FIG. 4C represents the relative potentials during an ion-ion reaction, and FIG. 4D represents the relative potentials of precursor and/or product ion accumulation in a center section of the device.

Figure 5A:
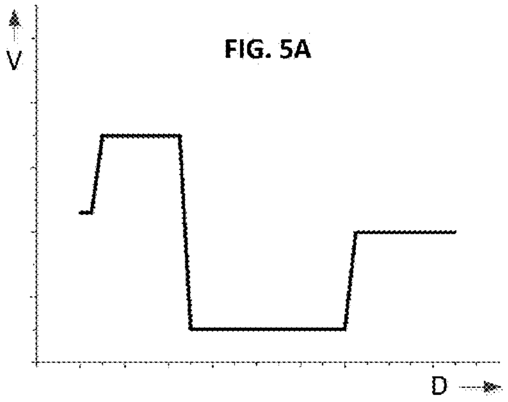
Figure 5B:
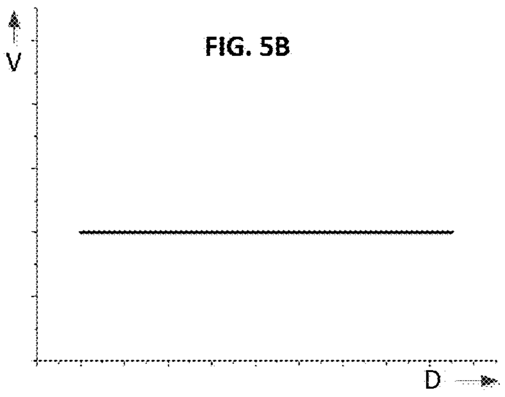
Figure 5C:
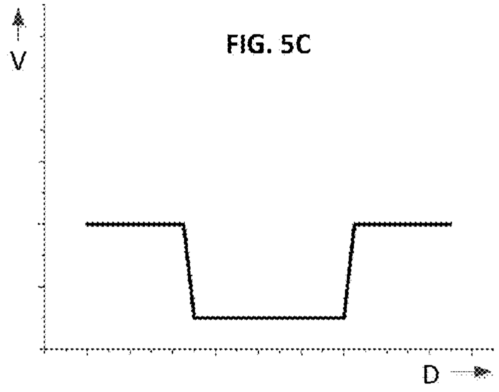

FIGS. 5A-C show further relative potentials within a three section RF electric field ion containment device. FIG. 5A represents the relative potentials when the negatively charged reagent ions are replenished. FIG. 5B represents the relative potentials for an ion-ion reaction, and FIG. 5C represents the relative potentials when positively charged precursor ions and/or product ions are accumulated again in the center section of the device.

FIGS. 6A-D shows 0.5, 1.0, 2.0 and 5.0 ms reaction times respectively for an ETD spectra of the 34+ charge state (854 m/z) of carbonic anhydrase versus reaction time in an ETD mode where a large excess of reagent may be maintained throughout the reaction.

FIGS. 7A-D show 0.5, 1.0, 2.0 and 5.0 ms reaction times (from top to bottom) for the fragment yield for the same precursor charge state in an ETD mode where a large excess of reagent is not present.

Figures 8A, 8B, 8C, 8D:
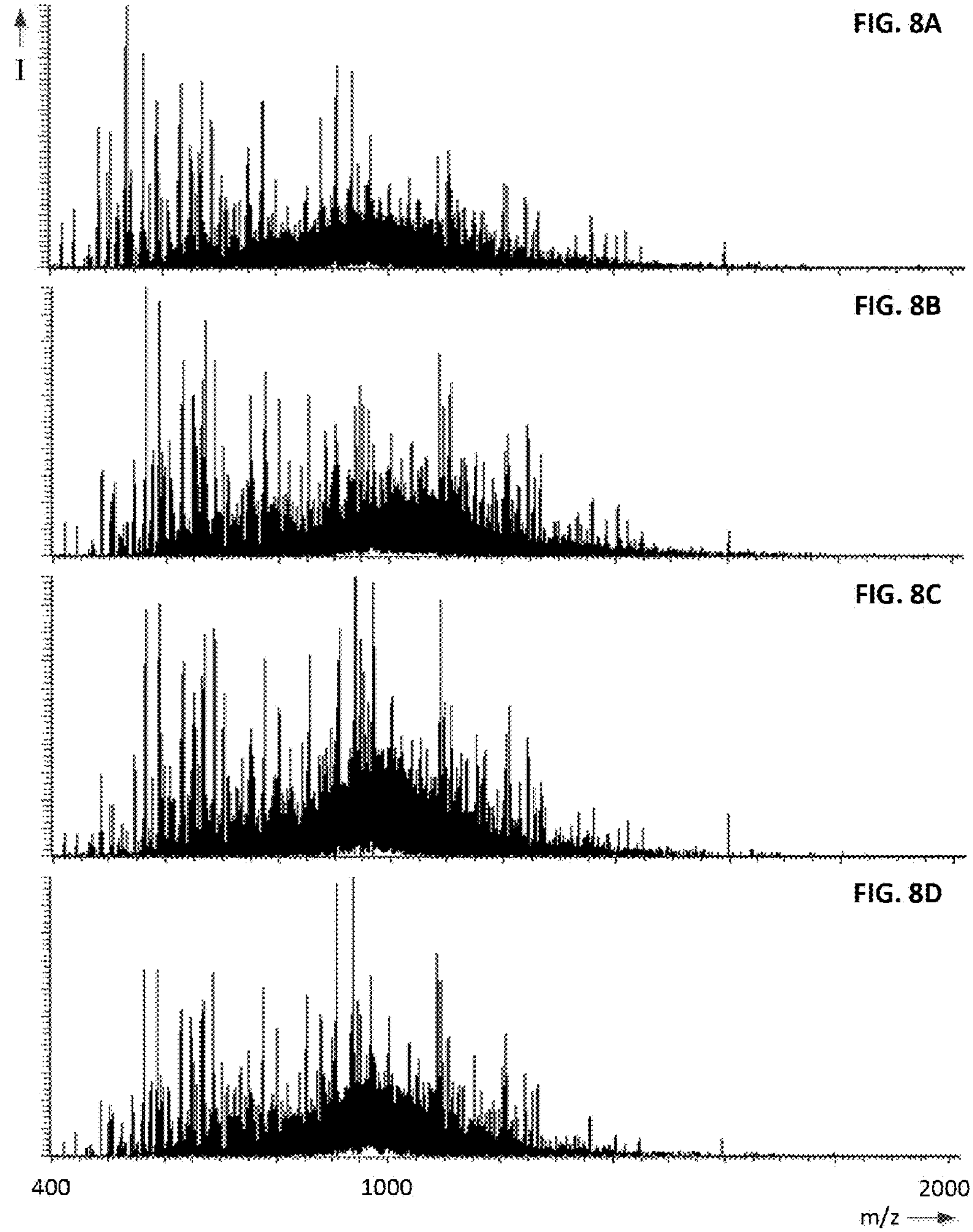
Figure 9:
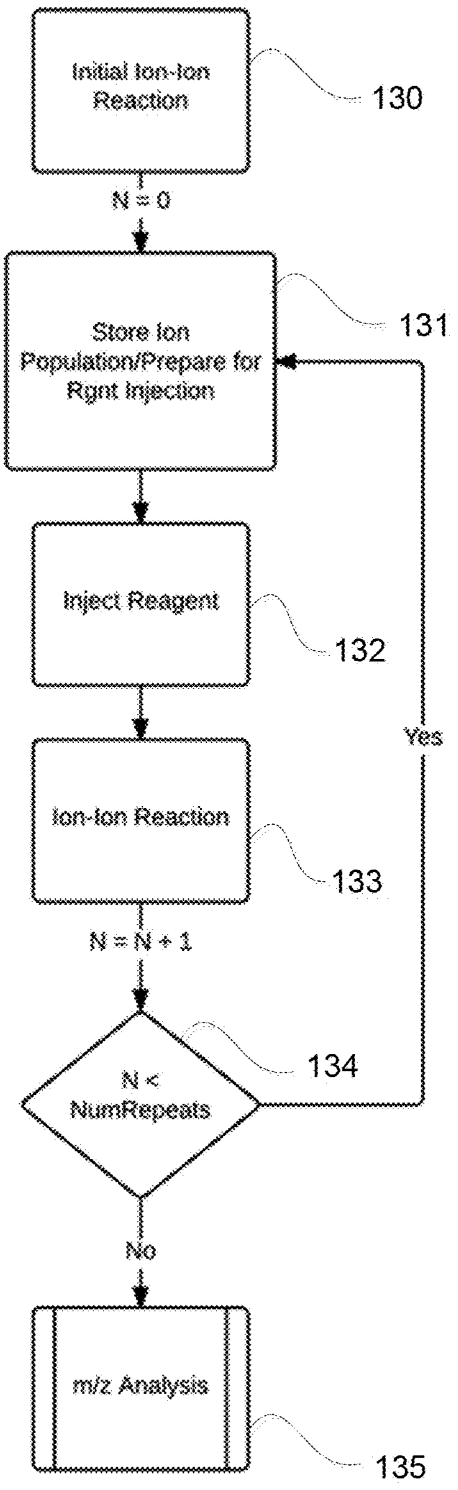

FIGS. 8A-D show a comparison of single fill ETD (8A) versus multiple reagent fills (8B-D) per m/z analysis FIG. 9 shows a flow chart depicting a workflow of an embodiment of the present invention.

DETAILED DESCRIPTION

The following description is presented to enable a person skilled in the art to make and use the invention, and is provided in the context of a particular application and its requirements. Various modifications to described embodiments herein will be readily apparent to those skilled in the art and the generic principles may be applied to other embodiments. Thus, the present invention is not intended to be limited to the embodiments and examples shown but is to be given the widest possible scope in accordance with the features and principles shown and described. The particular features and advantages of the invention will become more apparent with reference to the appended FIGS. 1-9, taken in conjunction with the following description.

Some embodiments of the present invention are disclosed describing a method that involves ion-ion mass spectroscopic charge reduction and fragmentation techniques. Several embodiments of the present invention are described in detail below, however, it should be stressed that these embodiments represent exemplary ways to perform the method and it should be noted that there are many more ways of using the method other than by rigorously following described embodiments. Any steps described in this specification may be performed in any order or simultaneously unless stated or the context requires otherwise. All of the features disclosed in this specification may be combined in any combination, except combinations where at least some of such features and/or steps are mutually exclusive. In particular, some features of the present invention are applicable to all aspects of the invention and may be used in any combination. Likewise, features described in non-essential combinations may be used separately (not in combination). The term "precursor ions" is meant to convey ions that have been selected for a particular stage of ion-ion reaction, these could be molecular ions (protonated adducts or otherwise charged unfragmented molecular entities) or fragment ions, for example, produced by in source fragmentation or formed in a collision cell.

Electrospray ionization (ESI) mass spectrometry is well-known to produce multiple charge states especially for biopolymers such as proteins and oligonucleotides. In general, the higher a molecular weight of a biopolymer molecule, the greater the chance of a molecule having a larger number charge states. For example, peptides (e.g. with MW between 1000 to 2500 Da) typically display around two to four major charge states in their positive ion ESI spectra (for example, +1, +2, +3 and +4) whereas larger proteins have a much larger charge state envelope. Carbonic anhydrase, for example, (MW of approximately 29,000 Da) has detectable charge states ranging, for example, from +8 to +40 (depending on the conditions of an ESI MS experiment).

Ion-ion reactions in mass spectrometry between two different ions of opposite polarities in a RF electric field ion containment device may be reduced to pseudo first order conditions when a large excess of one species is present.

Major reaction pathways available for ion-ion reactions performed under conditions described herein are ETD, nETD, and PTR. ETD (or negative ETD for negatively charged precursor ions and positively charged reagent ions) results in fragmentation of precursor ions and PTR results in charge state magnitude reduction of a precursor ion by a loss of a proton from a positively charged precursor ion.

Stephenson, et al. (Journal of the American Chemical Society, 1996, 118, 7390-7397) demonstrated that rates of these ion-ion reactions are proportional to the product of the charge stated squared of a particular reaction pair. Therefore, reactions involving precursors of high charge state consume reagent at a much higher rate than those of lower charge state during a fixed amount of reaction time and show deviations from pseudo-first order kinetics much sooner. One way of resolving this problem would be to scale the device to accommodate a large (in the order of 100× excess or higher) excess of reagent ions. According to embodiments of the present invention, a reagent "multiple fill" approach is used, where precursor and product ions present after an initial ion-ion reaction are reacted subsequently with a fresh batch of reagent ions until a predetermined amount of reaction completeness has been achieved. These subsequent reagent injection and reaction steps may or may not preserve pseudo first order kinetics, depending upon the number of reagent ions injected and the amount of reaction time used.

Although this method takes more time per mass analysis scan than a single reaction approach, a major benefit includes not having to scale up a RF electric field ion containment device. The term "high reagent excess" is used herein to denote an ion-ion reaction process where reagent ions are always in a vast excess over precursor/product ions (for example, in the order of 100× excess or higher). The term "low reagent excess" used herein describes an ion-ion reaction in which reagent ions are not always present in a large excess to the precursor/product ions and especially where reagent ions may be rapidly depleted by a larger number of precursor/product ions that have a large number of charge states. Although the term, "low excess reagent" is used in connection with some embodiments of the present invention it should not be construed to mean that this method could not be applied to other cases where reagent ions were not present in excess of precursor/product ions. Multiple fills of reagent ions where the precursor/product ions were in an excess or were approximately present in equal number as reagent ions while not being ideal, may still achieve a satisfactory result. Results in such cases may depend heavily upon reaction times and the number of reagent refills performed.

Figure 1A:
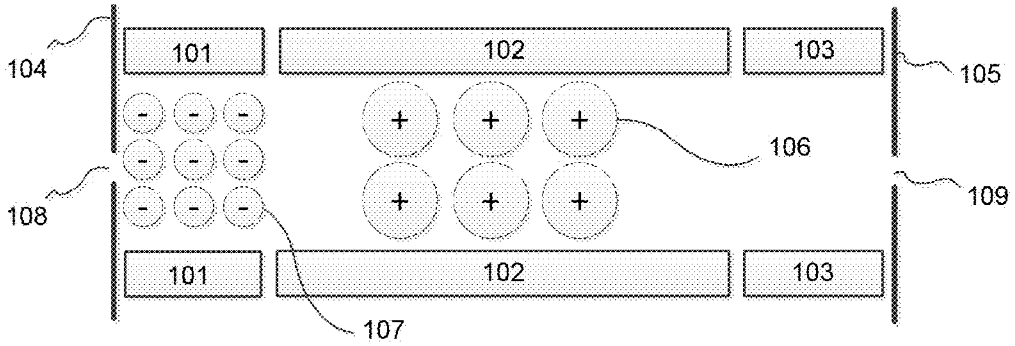
FIG. 1A show a cross-sectional representation of a three section RF electric field ion containment device. The center section of the device is populated with positively charged precursor ions and the front section of the device (left hand side as shown) is populated with negatively charged reagent ions.

FIG. 1A shows a longitudinal cross-sectional representation of a RF electric field ion containment device in the form of a linear ion trap or "cell". It shows the device having three main segments; a central section defined by four electrodes 102 (only two of four electrodes are shown), a front section defined by four electrodes 101 (only two of four electrodes are shown) and back section defined by four electrodes 103 (only two of four electrodes are shown). Ions may enter the device via aperture 108 and exit via aperture 109 or they may enter through aperture 109 and exit through aperture 108. Ions are contained axially by a front end cap electrode 104 and a rear end cap electrode 105 and in combination with the device section potentials.

In an embodiment of the present invention, a method of producing product ions for mass analysis is described. FIG. 1A shows precursor ions 106 that have been introduced into the central section of the device and reagent anions 107 introduced into the front section of the device. Precursor ions and reagent ions are then combined in an ion-ion reaction by removing potential differences between sections of the device holding positively charged precursor ions and reagent anions as shown in FIG. 1B in the presence of an RF pseudo-potential applied to end lenses 104 and 105 to contain an ion population during a reaction.

After an initial ion-ion reaction is complete, any unreacted reagent anions remaining in the device may be removed. Any reagent ions remaining after each reaction may be ejected from the RF electric field ion containment device by applying DC potentials or by resonant ejection. Precursor ions 106 and positively charged product ions 106' resulting from precursor ion fragmentation may be accumulated in the central section of the device as shown in FIG. 1C. Reagent anions are again introduced into the front section of the device as shown in FIG. 2A. FIG. 2B shows a depiction of a second ion-ion reaction where reagent anions are mixed with precursor and product ions. Precursor and/or product ion isolation and accumulation, followed by reagent injection, and ion-ion reaction are repeated until a predetermined amount of reaction completion is attained. A "predetermined" amount of reaction completion as used herein may refer to a user input or could be determined by instrument control software. This may include an estimate or be based on a calibration that uses knowledge of precursor ion charge state, the number of precursors and reagent ions, a reaction time, a reaction q (q values are well known in the art), and/or a pseudo $1^{st}$ order rate coefficient, for example. It may also take into account knowledge of a particular ion-ion reaction and particularly to the amount of reagent fills required to achieve a desired fragmentation yield. It may also refer to knowledge of a similar, known ion-ion reaction to an ion-ion reaction of interest, where the number of refills may be similar or calculable based on a known ion-ion reaction, or it may refer to an automated or semi-automated process whereby a user inputs a best-guess or nothing initially and a computer program calculates an optimum number of the device reagent refills. After a predetermined amount of reaction completeness product ions and any remaining precursor ions may be mass analyzed either directly from the device or transferred to a separate mass analyzing device.

Figure 1B:
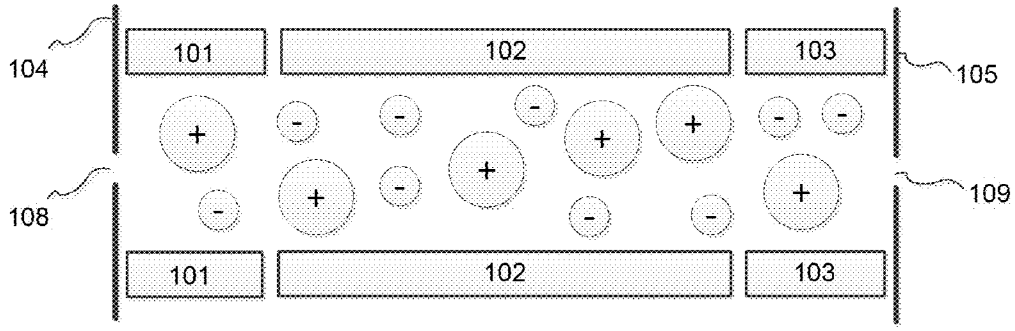
FIG. 1B shows the same device as in FIG. 1A containing mixed precursor ions and reagent ions.
Figure 1C:
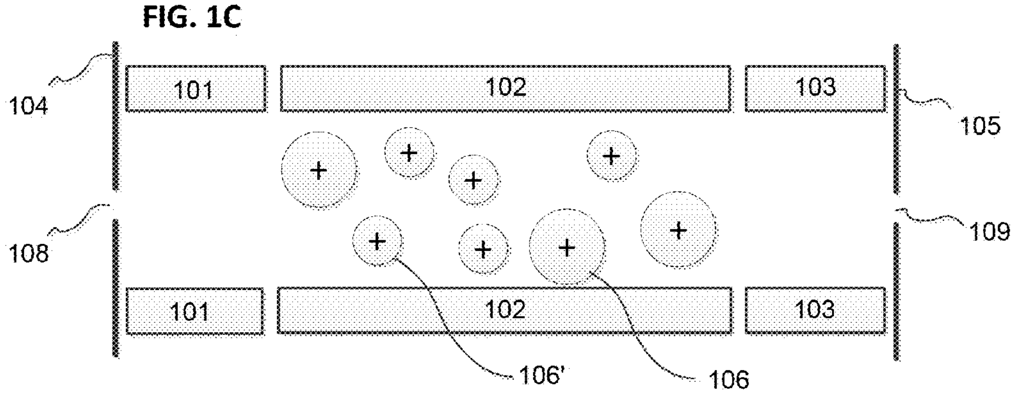
FIG. 1C shows the same device as in FIG. 1A containing precursor and product ions in only one section of the device (the center section as shown).
Figure 2A:
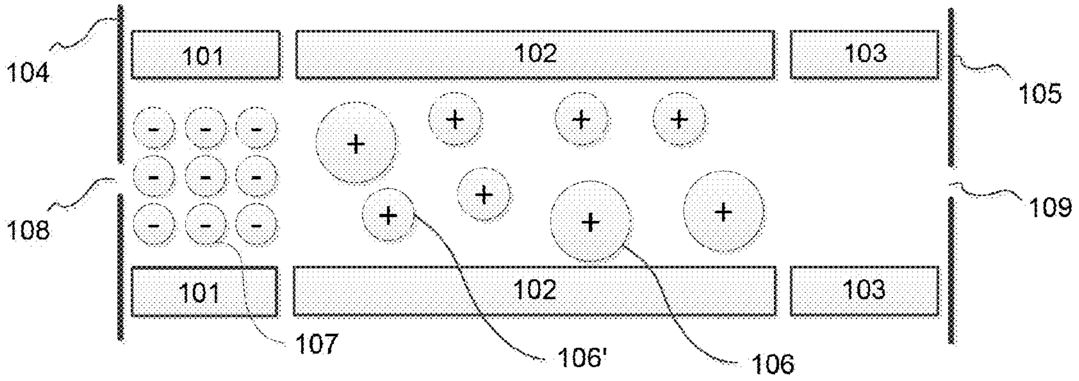
FIG. 2A shows the same device as in FIG. 1A with reagent ions in the front section and precursor/product ions in the center section.
Figure 2B:
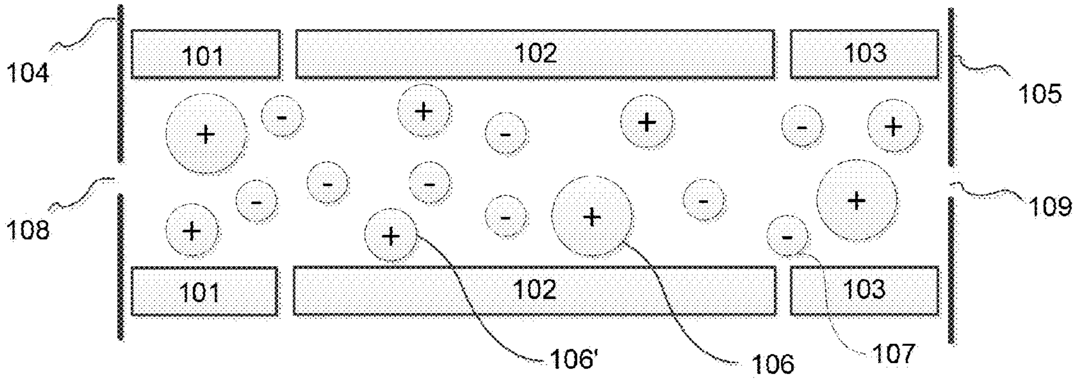
FIG. 2B shows the same device as in FIG. 1A containing mixed precursor ions/product ions and reagent ions.

Although FIGS. 1A-C show singly charged precursor/product ions this is only meant to be symbolic and represents the full range of "n+" charged precursor/product ions that may populate the devices where n a positive integer. Negative reagent ions in the figures are similarly shown as singly charged negative reagent ions but may carry one or more negative charges. Embodiments of the invention where the device comprises only two main sections defined by two sets of electrodes would be expected to function adequately here as only two sections are required in the device. Embodiments of the present invention that comprise two or more main sections defined by two or more sets of electrodes would also be expected to function adequately. One skilled in the art would recognize that nETD could similarly be performed using negatively charged precursor ions with positively charged reagent ions by appropriate manipulation of the device potentials. In addition, one skilled in the art would recognize that a same process may be applied to PTR reactions, where products of PTR reactions are charge reduced species.

Figure 2C:
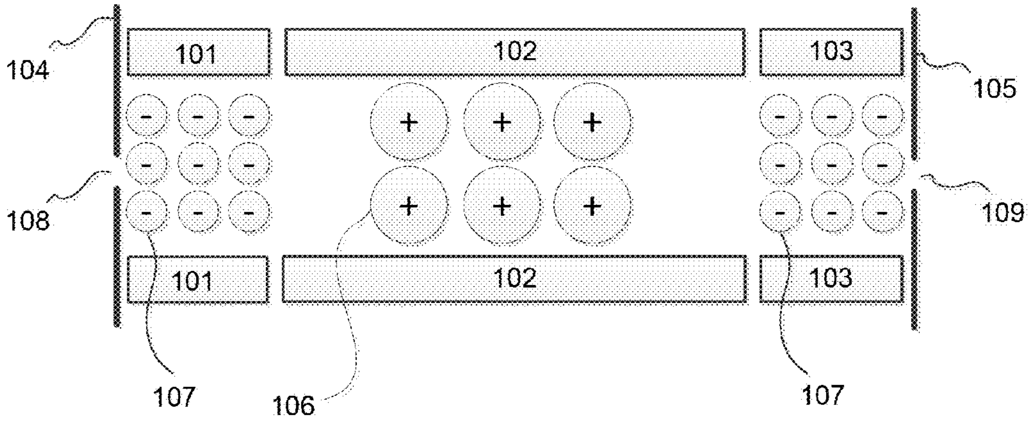
FIG. 2C shows a cross-sectional representation of a three section RF electric field ion containing device populated by positively charged precursor ions in the central section and negatively charged reagent ions in both the front and rear sections.

FIG. 2C shows an alternative filling regime wherein a rear section of the device is first filled with reagent ions, the central section of the device is then filled with precursor ions and then the front section is filled with negative reagent ions. Again, after filling, intra-cell potentials between sections holding positive precursor ions and negative reagent ions may be adjusted to allow positive and negative ions to mix and react together in an ion-ion reaction. This regime may be performed only for a first ion-ion reaction as after this the rear section of the device would be obstructed to incoming reagent ions by resident precursor or product ions.

Figure 3:
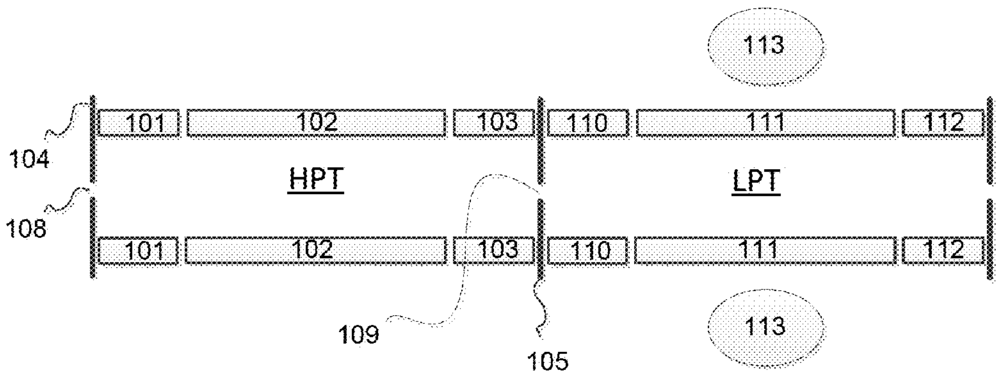
FIG. 3 shows a dual pressure linear ion trap with a high pressure section (HPT) and a lower pressure section (LPT).

FIG. 3 shows a dual pressure linear ion trap as a RF electric field ion containment device. In one embodiment of the present invention, precursor ions enter a high pressure trap (HPT) through aperture 108 and are stored in the central portion of the device. Reagent ions then enter the HPT through aperture 108 and are stored in the front section of the HPT, again, potentials are then adjusted to allow reagent ions to interact with precursor ions for an appropriate amount of time, such as approximately 200 ms to approximately 5 ms for peptides or approximately 40 ms to approximately 0.1 ms for proteins. Precursor ions are then gathered in the center section of the device while any unreacted or spent reagent ions are removed from the device or are lost as neutral particles. After a predefined number of ion-ion reaction iterations have been performed in a HPT that result in a desired amount of fragmentation, remaining precursor and product ions may be transferred to a low pressure trap (LPT) having similar electrodes to the HPT (front end 110, center section 111 and rear section 112), radially ejected and mass analyzed directly from the LPT, for example, by adjacent two dynode/electron multiplier pairs 113. Alternatively, ions from the HPT may be analyzed in a separate mass analyzing device, for example, in a quadrupole mass analyzer, in an electrostatic trap (for example, an ORBITRAP™), in a low pressure end of a dual pressure linear ion trap or in time of flight (TOF) mass analyzer.

Embodiments of the present invention address issues related to driving a reaction to a desired completeness when pseudo $1^{st}$ order conditions cannot be maintained. In an embodiment of the present invention and with reference to FIG. 9, primary precursor and reaction product populations present after a single ion-ion reaction 130 undergo successive cycles of ion accumulation and preparation for reagent injection 131, followed by reagent injection into the device 132 and ion-ion reaction 133, until a predetermined amount of reaction completeness is achieved. 134 is a decision branch point in a workflow, if the number of reaction repeats ("NumRepeats" or "N") is equal to a desired number of reaction repeats then m/z analysis occurs 135, if not, then the process loops back to step 131. In this respect it is a multiple reagent fills approach where reagent ions are replenished and ion-ion reactions are conducted each cycle based on the precursor/product ion population remaining in the device.

Mass analysis may occur either directly from the device, that is, precursor/product ions may be scanned out of the device in order of their m/z, or precursor/product ions may be transferred to a separate mass analyzer, for example, to an electrostatic trap (for example, an ORBITRAP™) or time of flight (TOF) analyzer.

FIGS. 4A to 4D and FIGS. 5A to 5C show the relative DC voltages applied to the device (for example, a HPT of a dual pressure linear ion trap) during various stages of a multiple reagent fills per m/z analysis approach, where the abscissa (D) represents the length along the device (not to scale), and ordinates represent a relative DC voltage (Volts). FIG. 4A shows an example of how the device may be filled with positively charged precursor ions by creating a potential minimum in the center section of the device: from left to right it shows a potential of entrance lens 104 (FIG. 3) dropping to a lower potential of the front section of the device controlled by four electrodes 101. This further drops to the lowest potential in the longest section of the device, the center section defined by the space between four electrodes 102. The rear section potential is higher than the front section in order to efficiently repel and trap positively charged precursor ions that initially flow into the device controlled by four electrodes 103, with the HPT rear lens 105 having the highest potential as seen on the extreme right hand side of FIG. 4A.

FIG. 4B from left to right, demonstrates an example of relative voltage potentials across the device when negatively charged reagent ions enter the front section of the device defined by the space between electrodes 101 (for example, in FIG. 3) through aperture 108 in front lens 104 while resident positively charged precursor ions remain stored in the center section defined by the space between electrodes 102. At this point a relative potential voltage of negatively charged reagent ions in the front section of the device will be positive and a relative potential of positively charge precursor ions resident in the center section of the device will be negative.

In an embodiment of the present invention, FIG. 4C shows normalized relative potentials between an entrance lens, front, center and rear sections of the device, and a rear lens (that is there is no potential difference between them) so that positively charged precursor ions mix and react with negatively charged reagent ions along the entire length of the device. FIG. 4D shows creation of a DC potential "well" such that positive ions are sequestered to the center section of the device and negative ions are allowed to escape.

FIGS. 4A to 4D are required to accomplish a primary ion-ion reaction, while the sequence of events depicted in FIGS. 5A to 5C are those which are sequentially looped through "N" times (FIG. 9, step 134) until a predetermined amount of reaction completeness has been achieved. Any reagent ions remaining after each reaction may be ejected from the RF electric field ion containment device using a DC potentials indicated in FIG. 5C. Removal of reagent ions may also be accomplished by resonant ejection. Reagent ions that react to become neutral species during an ion-ion reaction are not retained in the device. FIGS. 5A to 5C depict iterations of negatively charged reagent ion filling in FIG. 5A, ion-ion reactions in FIG. 5B, and removal of any remaining negatively charged reagent ions in FIG. 5D. In this embodiment all ions enter the device through an aperture 108, for example, in FIG. 3 in front lens 104. However, a person of ordinary skill in the art would recognize that any of the sets of ions, precursors or reagent ions, could be introduced either from the front of the device or from the rear of the device through aperture 109. This would of course necessitate the application of appropriate potentials in the device.

FIGS. 6A through 6D show high reagent excess ETD spectra of the $34^+$ charge state (854 m/z) of carbonic anhydrase versus reaction time in an ion-ion mode where positively charged precursor ions are loaded into the rear section of the device and negatively charged reagent ions (fluoranthene in this case) are loaded into the larger center section of the device. In this mode, a large excess of reagent ions may be maintained throughout a reaction as the precursor capacity of the back section of the device is approximately $3e^5$ charges (~8800 ions at $34^+$ charge state), while the capacity of the center section of the device for the reagent ions is in excess of $1e^6$. This gives a ratio of reagent ions to precursor ions of very approximately 100×.

Figures 6A, 6B, 6C, 6D:
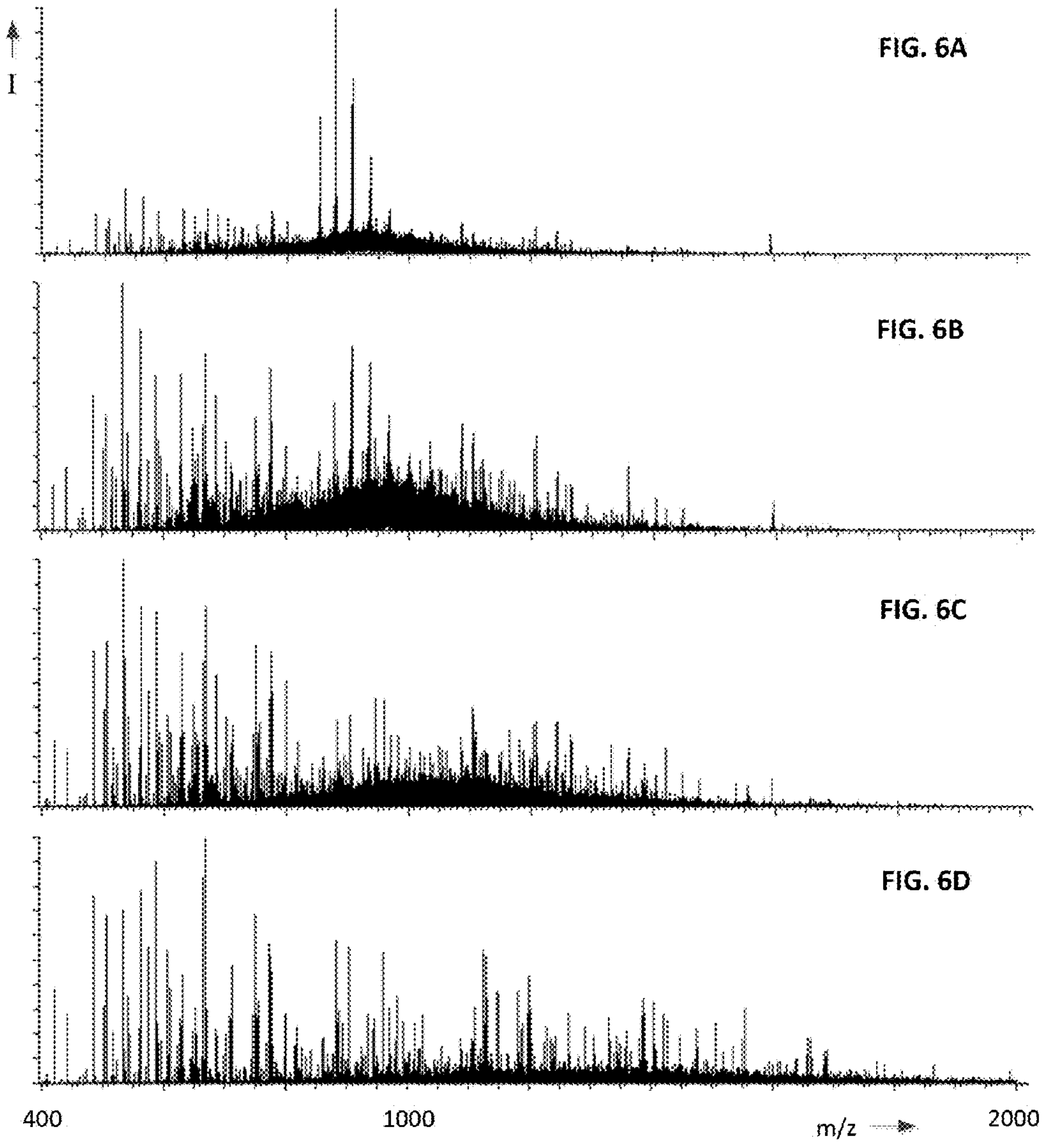

FIG. 6A indicates a reaction time of 0.5 ms, FIG. 6B, 1.0 ms, FIG. 6C, 2.0 ms and FIG. 6D, 5.0 ms. As reaction time is increased, the extent of fragmentation increases. Reaction completeness, while somewhat challenging to quantitatively measure in such a complex spectra, may be estimated by the distance of fragment ions in m/z space from a precursor ion mass to charge ratio and an amount of precursor and charge reduced species present. It is usually found that the further away the mass to charge ratios of some fragment ions are found from the precursor ion m/z, the more the reaction has progressed. By 5.0 ms of reaction time, fragment ion population is well spread throughout m/z space, that is, some of the fragment ions are found far away from the precursor ion m/z.

Figures 7A, 7B, 7C, 7D:
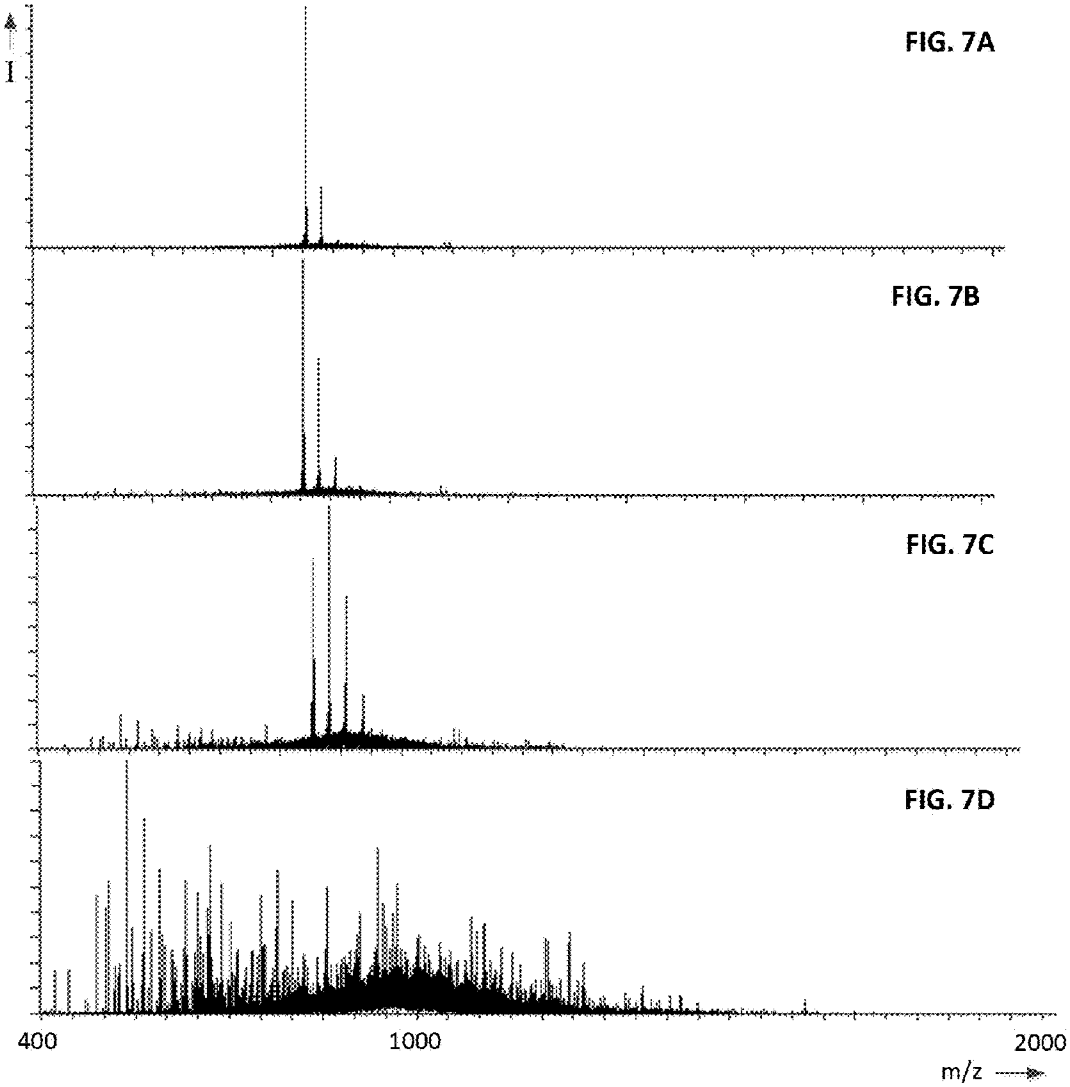

By contrast, FIGS. 7A through 7D show fragment yield for an ETD spectra of the $34^+$ charge state (854 m/z) of carbonic anhydrase in a low reagent excess ETD mode where precursor ions are injected into the center section of a HPT of a dual pressure linear ion trap and reagent anions are injected into the front section of the HPT. FIG. 7A is after a reaction time of 0.5 ms, FIG. 7B is after 1.0 ms, FIG. 7C is after 2.0 ms and FIG. 7D is after 5.0 ms. Charge capacities are roughly $1e^6$ precursor charges (~30,000 ions with multiple charge states) and about $3e^5$ reagent anions with, for example, a single negative charge for each ion. With an excess of reagent/precursor ratio of approximately 10× (ten times less than in the case for high ratio ETD) at the start of a reaction, it can be seen that the kinetics have slowed down dramatically, for example, comparing FIG. 6C (large excess) with FIG. 7C (small excess), both having a reaction time of 2.0 ms, it is clear that significantly more fragmentation has occurred in the high reagent excess ETD reaction.

FIGS. 8A-D compare ETD spectra taken with a large excess of reagent to ETD spectra having a lower excess of reagent ions to precursor ion in a multi-reagent fill approach. FIG. 8A (high ratio ETD, single fill, reaction time 1.0 ms), FIG. 8B (low ratio ETD, two reagent ion fills, reaction time 3.0 ms), FIG. 8C (low ratio ETD, three reagent ion fills, reaction time 1.5 ms) and FIG. 8D (low ratio ETD, four fills, reaction time 1.0 ms) demonstrate the efficacy of the multiple reagent fills per m/z analysis approach by showing that approximately the same amount of reaction completeness can be achieved with an appropriate combination of number of reagent fill cycles and reaction times, which was not attainable with a low excess single ion-ion reaction approach. While this is usually more time consuming than a single fill because of the scan matrix overhead time associated with looping (time associated with injecting and moving ions around before m/z or mass analysis) and additional time required for a successive reagent injection and reaction events, it does allow the accomplishment of any amount of reaction completeness desirable.

When an ion-ion reaction is conducted in parallel with m/z analysis on certain instruments, for example, in a case involving an ORBITRAP™ Fusion mass spectrometer, the time penalty associated with a multiple reaction per mass analysis approach may be partially or completely offset as an operating time of a mass analyzer may be relative slow compared with the time penalty.

A high excess, single reagent ion fill approach where ion-ion reactions establish and maintain pseudo first order reaction conditions is a desirable method for collecting data as it produces predictable and reproducible spectra. This method works well for small to medium size precursors that do not support high charge states in ESI. However, some embodiments of the present invention are particularly effective when a low ratio reagent excess is encountered. It is generally directed towards medium to large precursor ions that attain high charge states in ESI. As previously mentioned, it takes more time but ensures that a desirable amount of reaction completeness may be accomplished regardless of an initial precursor charge state without modification of instrument hardware.

The present invention has been described in terms of specific embodiments incorporating details to facilitate the understanding of principles of construction and operation of the invention. Such reference herein to specific embodiments and details thereof is not intended to limit the scope of the claims appended hereto. It will be readily apparent to one skilled in the art that various other modifications may be made in the embodiments chosen for illustration without departing from the spirit and scope of the invention as defined by the claims.

What is claimed is:

1. A method of producing product ions for mass analysis, comprising:

(a) introducing a population of precursor ions into an RF electric field ion containment device;

(b) introducing a population of reagent ions into the RF electric field ion containment device;

(c) performing an ion-ion reaction in the RF electric field ion containment device by co-trapping the population of precursor ions with the population of reagent ions;

(d) retaining and/or isolating a population of precursor and/or a population of product ions in the RF electric field ion containment device;

(e) repeating steps (b) through (d) using the same reagent ion type until a predetermined amount of reaction completeness is attained;

(f) mass analyzing at least some ions remaining in the RF electric field ion containment device, wherein the ions are analyzed directly from the RF electric field ion containment device or wherein the ions are transferred to a separate mass analyzer;

wherein the ion-ion reaction occurs between the population of reagent ions and the population of precursor ions and/or between the population of reagent ions and the population of product ions; and, wherein the ion-ion reaction with an initial or first population of reagent ions is insufficient to reach the predetermined amount of reaction completeness.

2. The method according to claim 1, wherein any unreacted reagent ions and/or reacted reagent ions from the RF electric field ion containment device are ejected during or directly after performing the ion-ion reaction step.

3. The method according to claim 1 wherein the RF electric field containment device is a quadrupolar device.

4. The method according to claim 1, wherein the RF electric field ion containment device is a hexapole, octopole or higher multipole.

5. The method according to claim 1, wherein the RF electric field ion containment device is an ion trap.

6. The method according to claim 5, wherein the ion trap is a linear ion trap.

7. The method according to claim 5, wherein the linear ion trap is segmented into a front section, a middle section and a rear section.

8. The method according to claim 1, wherein the RF electric field ion containment device contains two or more sections.

9. The method according to claim 6, wherein the linear ion trap comprises a high pressure ion trap and a low pressure ion trap.

10. The method according to claim 1, wherein the reagent ions are selected from the group including azulene, azobenzene, 2,2'-biquinoline, homazulene, acenaphthalene, fluoranthene, perfluorodecalin, perfluoro-methyl-decalin, xenon, iodine, perfluoroperhydrophenanthrene, and any combination thereof.

11. The method according to claim 1, wherein the reagent ions and precursor ions occupy separate, distinct sections of the RF electric field ion containment device prior to performing ion-ion reactions.

12. The method according to claim 1, wherein the ion-ion interaction is an ETD reaction, a negative ETD reaction or a proton transfer reaction.

13. The method of claim 1, wherein the reagent ions are initially in excess of the precursor ions.

14. The method of claim 1, wherein the reagent ions are initially approximately comparable in number to the precursor ions.

15. The method of claim 1, wherein the precursor ions are initially in excess of the reagent ions.

* * * * *